United States Patent [19]
Kaasila

[11] Patent Number: 5,155,805
[45] Date of Patent: Oct. 13, 1992

[54] METHOD AND APPARATUS FOR MOVING CONTROL POINTS IN DISPLAYING DIGITAL TYPEFACE ON RASTER OUTPUT DEVICES

[75] Inventor: Sampo Kaasila, Cupertino, Calif.

[73] Assignee: Apple Computer, Inc., Cupertino, Calif.

[21] Appl. No.: 348,806

[22] Filed: May 8, 1989

[51] Int. Cl.$^5$ .............................................. G06F 15/72
[52] U.S. Cl. ................................... 395/151; 395/150; 340/730; 340/735; 340/739
[58] Field of Search ....................... 364/518, 521, 522; 340/706, 747, 750, 735, 730, 739; 395/150, 151

[56] References Cited
U.S. PATENT DOCUMENTS 4,897,801  1/1990  Kazama et al. ...................... 364/521
4,905,168  2/1990  McCarthy et al. .................. 364/521

Primary Examiner—Gary V. Harkcom
Assistant Examiner—Phu K. Nguyen
Attorney, Agent, or Firm—Blakely, Sokoloff, Taylor & Zafman

[57] ABSTRACT

A method for manipulating the control points of a symbol image represented by an outline font to improve the appearance of the font on raster output devices which are under control of a computer. The method includes storing control points specifying the outlines of a symbol image, specifying the desired movement direction defined by a first unit vector in which the control point should move, and specifying a desired measurement direction defined by a second unit vector by which the movement of the control point should be measured. The desired measurement direction and the desired movement direction forming an angle of predetermined size. The method further includes moving the control points in the desired movement direction and measuring the control points against the predetermined angle with the desired measurement direction, this measurement producing a resulting movement direction and storing the results of the manipulation of the control points in a memory.

4 Claims, 14 Drawing Sheets

NPUSHB [0]
MDAP [1]  9
MIRP [01101]  15 37
MDRP [11101]  3
MIRP [01101]  21 37
IUP [1]
DELTA [0]  86 1 86 5 214 11 217 1 214 7 217 5 230 11 233
           1 230 7 233 5 242 11 253 1 242 7 253 5
SVTCA [0]
MIAP [0]  0 6
MIRP [01101]  12 24
MIAP [0]  6 3
MIRP [01101]  18 24
IUP [0]
DELTA [0]  51 11 60 7 60 5 51 1 67 11 76 7 76 5 67 1 166
           4 169 10 166 8

FIG 11

| INPUT RANGE | OUTPUT RANGE |
|---|---|
| 0 | −8 |
| 1 | −7 |
| 2 | −6 |
| 3 | −5 |
| 4 | −4 |
| 5 | −3 |
| 6 | −2 |
| 7 | −1 |
| 8 | 1 |
| 9 | 2 |
| 10 | 3 |
| 11 | 4 |
| 12 | 5 |
| 13 | 6 |
| 14 | 7 |
| 15 | 8 |

FIG. 13
H 1.0A163·Instructions
Pts:[1, 1, 7]    R2G:1    Loop:0
minD:64  sWide:0  FLIP  Δ B:9  Δ S:3
Proj:     Free: 
Stack: 7 8 4 7 10
0>NPUSHB[0]
1>MDAP[1]  3
2>MIRP[11101]  2  37
3>IP[0]  7
4>MDAP[1]  7
5>IUP[1]
6>DELTA[0]  24  5  76  8  68  6  92  8  8
7>SVTCA[0]
8>MIAP[0]  3  1
9>MIAP[0]  5  7
10>MIAP[0]  8  7
11>SPVTL[1]  0  1
12>SFVTL[0]  6  7
13>SRP0[0]  1
14>MDRP[01001]  7
15>SPVTL[1]  5  4
16>SFVTL[0]  8  7
17>SRP0[0]  4
18>MDRP[01001]  7
19>IUP[0]
20>SVTCA[0]
21>DELTA[0]  56  4  56  1  73  1  73  4  9

METHOD AND APPARATUS FOR MOVING CONTROL POINTS IN DISPLAYING DIGITAL TYPEFACE ON RASTER OUTPUT DEVICES

The present application has been filed concurrently with and is related to U.S. patent application Ser. No. 07/348,703, filed May 8, 1989, and hereby refers to and incorporates by reference the contents of the above-referenced application.

BACKGROUND OF THE INVENTION

1. Field of the Invention

The present invention relates to the field of digital typography. In particular, the present invention enables font-rendering engines to render high quality digital typefaces for displaying on low raster output devices.

2. Background of Prior Art

Existing digital font-rendering techniques on computers can be classified into three categories: (1) bitmap type, (2) algorithmic type, and (3) outline type.

Bitmap rendering techniques are the most direct way to display fonts as ultimately all fonts must be realized as bitmaps in the raster output devices such as printer or CRT. Here, fonts are described and manipulated as explicit bitmaps. However, such techniques consume a sizable amount of the computer's memory. (For example, see U.S. Pat. No. 4,029,947). Given the large variety of typefaces, selection of point sizes, and infinite choice of resolutions, bitmap rendering techniques are awkward to store and manipulate.

Algorithmic rendering techniques describe and specify typefaces with algorithmic programs. Such programs could be parametric, enabling font designers and developers to change a design via parameters each time the program is executed.

Outline rendering techniques describe and manipulate typefaces as outlines. A compact representation of font results from the use of splines to record and regenerate the shape of curves. Splines are curves that are controlled by a small set of given control points and tangents. Some manufacturers of outline fonts in the world use a system based on the principles of IKARUS. See Peter Karow, *Digital Formats for Typefaces*, (URW Verlag, 1987). Outline font-rendering techniques create outlines from digitized input of typefaces and convert outlines automatically to equivalent bitmap forms for output to raster output device, such as a printer or CRT. Representing idealized design by outlines not only obviates large memory storage but also permits interactive editing by the font designer.

Nevertheless, outlines do not render perfect characters at all point sizes. Most outline font renderers are based on data structures which assume pre-defined steps in controlling outlines. A few outline font formats have primitives. Primitives are basic method to control outlines, such as correcting the height typefaces. The smaller number of pixels at low raster resolution makes it difficult to match fonts of different size and resolution. It is noted that most of the raster output devices in current use, such as CRT and draft printers, are of the low raster resolution category. As such, it is important to improve the resulting bitmap of typefaces at low raster resolution.

It is, therefore, an objective of the present invention to improve the outline control of font renderers at low raster resolution.

SUMMARY OF THE INVENTION

The present invention provides methods and apparatus which are most advantageously used in conjunction with a digital computer to provide improved font rendering capability. These techniques permit font rendering engines to improve font display at low raster resolution. A font is a collection of glyphs which generally have some element of consistency in their appearance (e.g. serifs, or stroke thickness). A glyph is a graphical depiction which usually represents a character, symbol, or other textual object. An outline font is a compact way to represent glyphs on digital computer by creating outlines from control points on the glyphs.

In accordance with one typical embodiment of the present invention, there is provided means for accepting an input representation of outlines of a font, which may be comprised of alphanumericals, non-Roman based characters, or any arbitrary symbols. This input representation is most advantageously coupled to a digital computer. Once received, a control program within the computer memory displays the outlines on an appropriate device, such as a CRT, of the selected glyph. Font instructions incorporating scaling, interpolating, and grid-fitting techniques are available for a user to produce outline of typefaces at various sizes and resolutions. Grid-fitting is the alignment of control points in a digital outline description to a grid and other manipulation of the control point positions for the purpose of facilitating scan conversion outputs.

Because outlines do not create perfect characters at all sizes (particularly smaller sizes), font rendering engines are restricted in their ability to enhance the resulting bitmap at low raster resolution.

Means to manipulate outlines and means to move control points are disclosed in the present invention to improve the font rendering engine's control over outlines of a glyph at low raster resolutions. Means to manipulate outlines is an exception to other font rendering techniques: when properly structured, it moves control points on the outlines of a glyph at specific size by one or multiple fractions of a pixel. Means to move control points is a method to move control points and lines connected to them in an advantageous direction and displacement such that the digital typeface maintains its proper weight, contrast, and appearance. Weight measures the stem thickness of a glyph. Contrast is the ratios between vertical stem thickness and horizontal stem thickness. Means to move control point also measures and controls distance along the desired path it should move.

BRIEF DESCRIPTION OF THE DRAWINGS

FIG. 11. illustrates internal remapping table for Delta exception.

FIG. 13. illustrates the step by step implementation of FIG. 12.

NOTATION AND NONMENCLATURE

Figure 1:
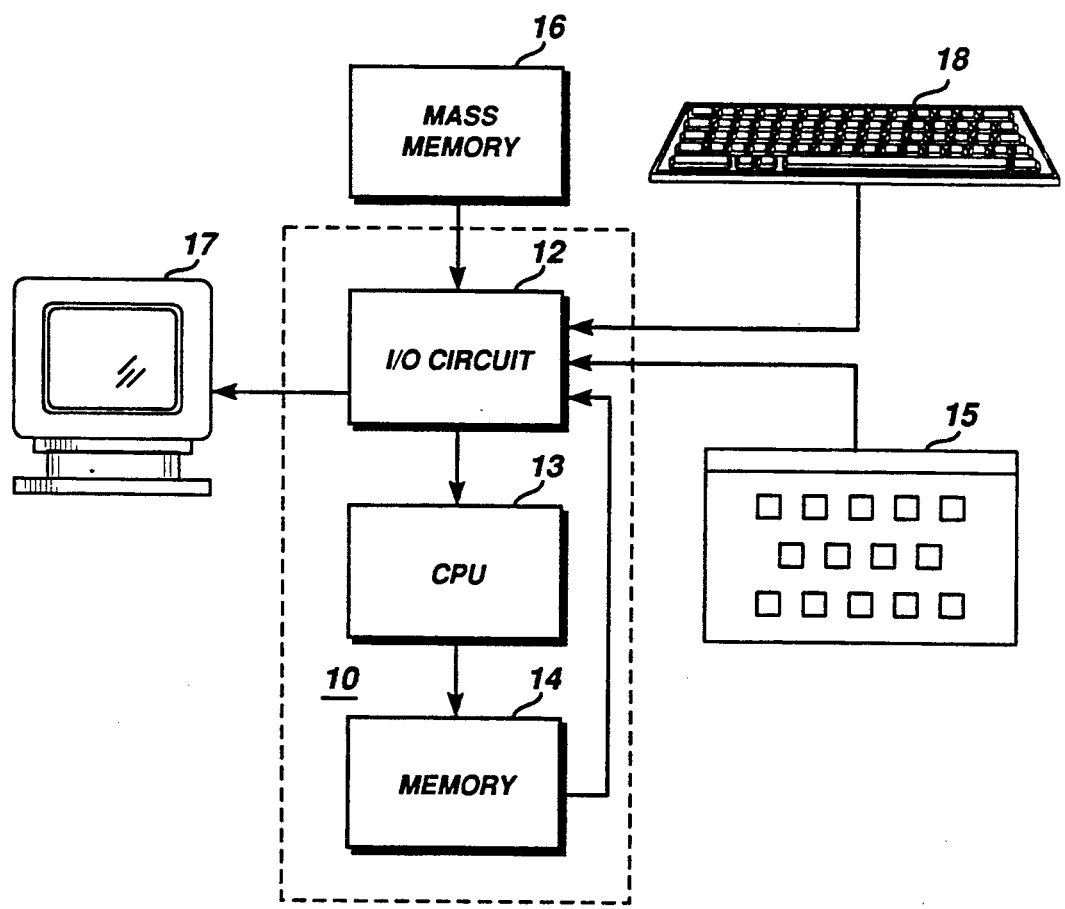
FIG. 1. illustrates a computer incorporating the present invention.

The detailed description which follows is presented largely in terms of algorithms and symbolic representations of operations on data bits and data structures within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulation of physical quantities. Usually, though necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulation performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method operations in operating a computer and the method of computation itself. The present invention relates to method steps for operating a computer in processing electrical or other (e.g. mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

DETAILED DESCRIPTION OF THE INVENTION

The following detailed description will be divided into several sections. The first of these will treat a general system arrangement for generating computer digital fonts. Subsequent sections will deal with such aspects of the process of creating outlines of a font, of specifying a size and a resolution the glyph would be displayed, and the use of Delta exceptions in manipulating outlines by one or multiple fractions of a pixel when desired to improve the resulting bitmap. A specific application of the use of Delta exceptions will be shown in connection with modifying a lowercase letter "o". Finally, Projection and Freedom vectors are illustrated in moving control points and shown in an example to maintain the diagonal stroke weight of a capital letter "Y".

In addition, in the following description, numerous specific details are set forth such as algorithmic convention, specific numbers of bits, etc., in order to provide a thorough understanding of the present invention. However, it will be obvious to one skilled in the art that the present invention may be practiced without these specific details. In other instances, well-known circuits and structures are not described in detail in order not to obscure the present invention unnecessarily.

GENERAL SYSTEM CONFIGURATION

FIG. 1 shows a typical computer-based system for generating computer graphic images according to the present invention. Shown there is a computer 10 which comprises three major components. The first of these is the input/output (I/O) circuit 12 which is used to communicate information in appropriately structured form to and form the other parts of computer 10. Also shown as part of computer 10 is the central processing unit (CPU) 13 and memory 14. These latter two elements are those typically found in most general purpose computers and almost all special purpose computers. In fact, the several elements contained within computer 10 are intended to be representative of this broad category of data processors to fill the role of computer 10 included machines manufactured by the Apple Computer Co., Cupertino, Calif. Other computers having like capabilities may of course be adapted in a straightforward manner to perform the several functions described below.

Also shown in FIG. 1 is an input device 15, shown in typical embodiment as a keyboard. It should be understood, however, that the input device may actually be a card reader, magnetic or paper tape reader, or other well-known input device (including, of course, another computer). A mass memory device 16 is coupled to the I/O circuit 12 and provides additional storage capability for the computer 10. The mass memory may include other programs, fonts for given characters, and the like and may take the form of a magnetic or paper tape reader or other well known device. It will be appreciated that the data retained within mass memory 16, may, in appropriate cases, be incorporated in standard fashion into computer 10 as part of memory 14.

In addition, a display monitor 17 is illustrated which is used to display the images being generated by the present invention. Such a display monitor may take the form of any of several varieties of CRT displays. A cursor control 18 is used to select command modes and edit graphic data, such as for example a particular image, and provides a more convenient means to input information into the system.

Figure 2:
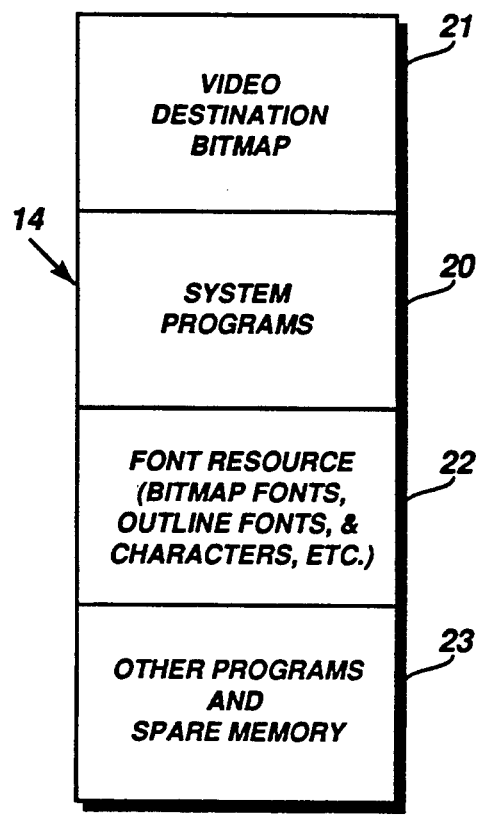
FIG. 2. shows a typical arrangement of program storage in the system of FIG. 1.

FIG. 2 shows a typical arrangement of the major programs contained within the memory 14 illustrated in FIG. 1. In particular, there is shown a video destination bitmap 21. This destination bitmap represents the video memory for the display monitor 17. Each bit in the destination bitmap corresponds to the upper left coordinate of a corresponding pixel on the display monitor. Thus, the destination bitmap can be described as a two-dimensional array of points having known coordinates. Of course, in the present case, where the display monitor is used in conjunction with a low raster output device such as a printer, the contents of the bitmap 21 would be the resulting bitmap and represent the data points to be displayed by the particular low resolution raster output device.

Memory 14 also include system program 20 which represent a variety of sequences of instructions for execution by the CPU. For example, the control programs such as the interpreter, scan converter, disk operating systems and the like may be stored within this memory location.

Font resource 22 contains bitmap fonts, outline fonts, coordinates and characters in memory 14 or may be stored temporarily in mass memory 16 as may be required in any given application of the present invention. Additionally, space within memory 14 is reserved for other programs and spare memory which is designated at 23. These other programs may include a variety of useful computational or utility programs as may be desired.

PROCESS OVERVIEW

The process of the present invention will be best understood in reference to the steps a font designer would go through in creating an outline font, in scaling a glyph to a smaller size, and in grid-fitting the outlines at low raster resolution.

Below are some units of measurement commonly used in the field of digital typography that are helpful in relating quantity and quality expressed herein. The size of a type is measured in points. An inch has about 72 points. The resolution of an raster output device is expressed in dots per inch (dpi). Laser printers typically have a resolution of 240 to 400 dpi, while CRTs have a resolution of 50 to 200 dpi. To express the size of a type to be displayed in a particular raster output resolution, one uses Pixels per em (ppem). It is the product of point size and resolution divided by the number of points in an inch.

Figure 3:
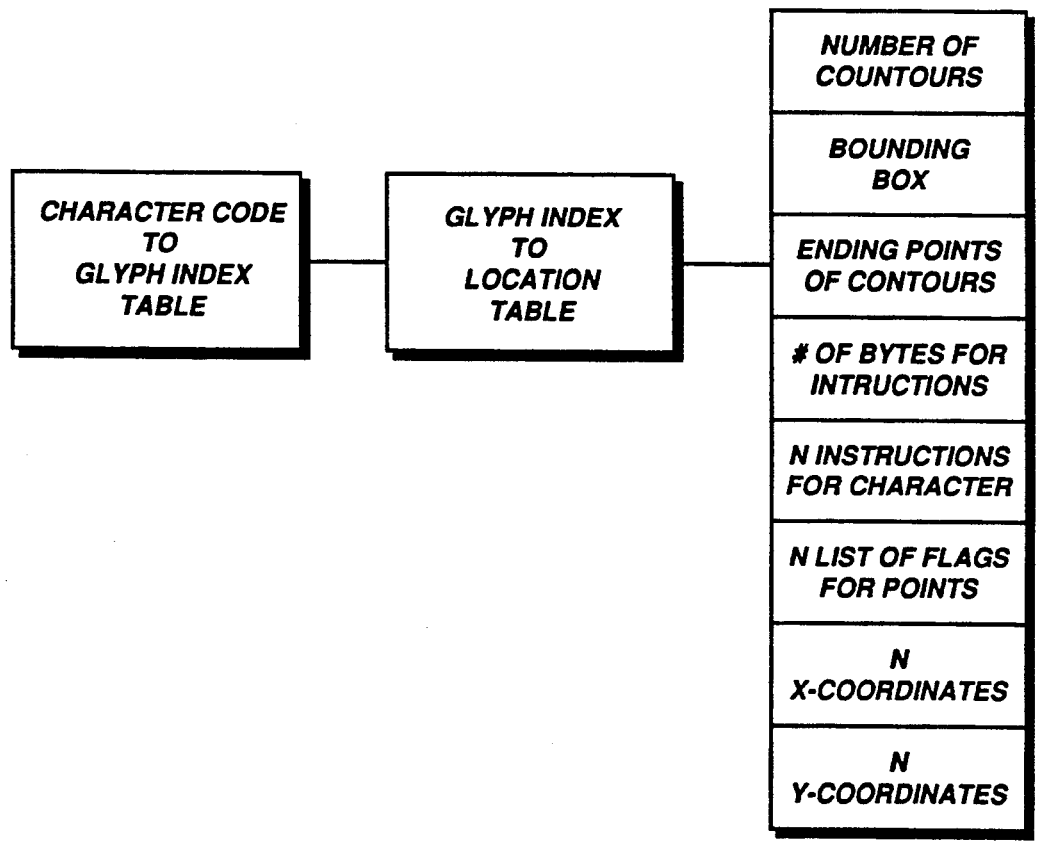
FIG. 3. illustrates a typical B-spline outline data structure for storing a glyph.

In FIG. 2, Font resource 22 consists of a data structure which houses the actual outline fonts along with bitmap fonts and other standard character sets. A font designer would build an outline font by first describing and storing a glyph in an outline or spline format. 2nd order B-splines are an important class of spline because they provide good approximation to letterforms, are relatively fast computationally, and offer users both on-curve and off-curve control points. To specify the outlines of a glyph using 2nd order B-spline, one has to supply: (i) the number of outlines, (ii) last point of every outline, and (iii) a flag indicating if a control point is on or off the outline. Thus glyph are specified in the following format as provided by FIG. 3:

| Field | Bytes | Sign | Description |
| --- | --- | --- | --- |
| | 2 | Unsigned | Number of contours |
| | 8 | Signed | Bounding box: x-min y-min; x-max; & y-max |
| | n | Unsigned | Endings points of outlines |
| | 2 | Unsigned | # of bytes used for instructions |
| | n | Unsigned | instruction for glyph |
| | n | Unsigned | list of flags for points |
| | n | Unsigned | x-coordinates |
| | n | Unsigned | y-coordinates |

The first starting point is expressed in terms of absolute x and y-coordinates, and is by definition always point 0 (zero). For all following outlines, the starting point is the ending point of the last outline plus one. Applying the above format to our example in FIG. 6, we would have the following data structure:

| Characteristic | Number | Description |
| --- | --- | --- |
| Number of outlines | 2 | The outside of letter "o" and the inside of the same. |
| Bounding Box | x-min; y-min x-max; y-max | The box bounding a glyph. |
| Ending points of | 11, 23 | The outline for the outside goes from 0–11 and the inside from 12–23. |
| # of bytes for instructions | n | This length specifies how many bytes are for instructions. |
| Instructions | n bytes | Actual control program for each glyph |
| List of flags | 24 flags for 24 points | |
| x-coordinates | 48 bytes for 24 points | Size smaller if compact method with flags is used |
| y-coordinates | 48 bytes for 24 points | Size smaller if compact method with flags is used |

Figure 4:
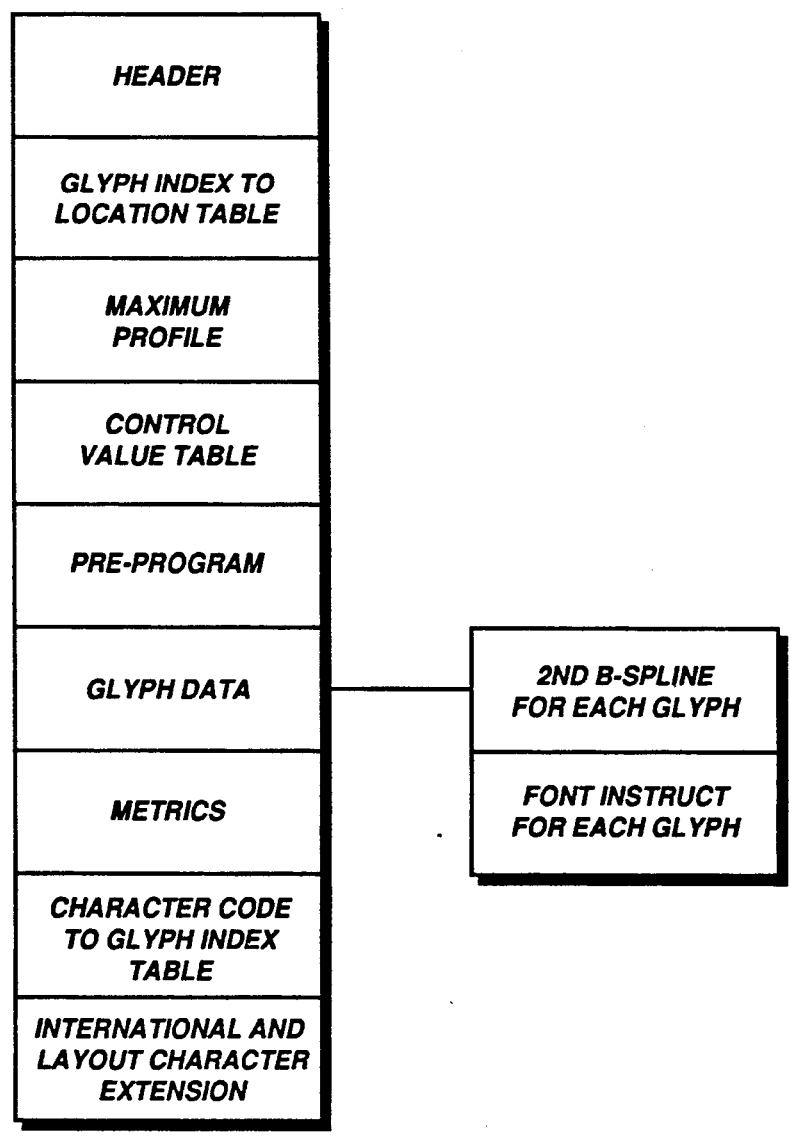
FIG. 4. illustrates a typical B-spline outline data structure for storing a font.

FIG. 4 illustrates a possible data structure for an outline font as a family of related glyphs is described and stored in the font resource. Of particular interest to the user are the Control Value Table and the Pre-Program. The Control Value Table contains a set of figures that can be used to set uniform sizes for different glyph or character elements. For instance, the following information may be stored:

| | |
| --- | --- |
| Capital height | |
| x-height | |
| ascender height | (for rounded characters and flat ones) |
| descender height | (for rounded characters and flat ones) |
| figure height | (for rounded characters and flat ones) |
| overlaps | (example: how much is taller a capital "O" than a capital "H") |
| width of character stems, etc. | |

The contents of the Control Value Table correspond to the basic units of measurement in the field of digital typography. X-height is the basic height of the lowercase letter "x", while ascender is that parts of the lowercase letters that reach above the x-height and descender is that parts that fall below the baseline. As such, instructions using values from the Control Value Table can scale glyphs to the appropriate point size.

The Pre-Program in FIG. 4 is a collection of instructions that modify the Control Value Table within the outline font. Whenever the user selects a new font or a new point size in the same font, the Pre-Program is executed to modify the values in the Control Value Table. Similarly, the Pre-Program sets up the Graphic State of the interpreter before the user begins working with the new font or point size. The Graphic State is divided into a local and global state. The local Graphic State does not have any inter-glyph memory, so it is fresh for each glyph. In contrast, the global Graphic State has inter-glyph memory and also stays in effect between the Pre-Program and the glyph.

Figure 5:
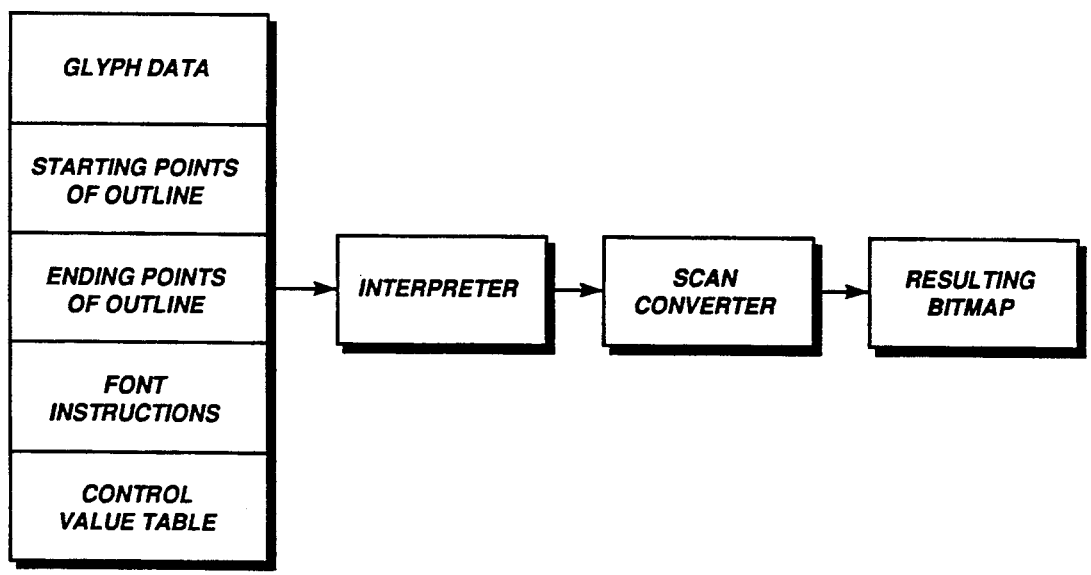
FIG. 5. illustrates a flow chart of the process of converting B-spline font data into digital typeface through a interpreter and scan converter.

FIG. 5 shows an interpreter and scan converter. The input to the interpreter consists of the control points that make up a glyph, information describing the beginning and the end of the outlines, Pre-Program, font instructions, and the Control Value Table. The interpreter has a Graphic State which defines the context in which any of the font instructions operate. Through the use of font instructions; the grid-fitting of a glyph, regularization of text, and other operations upon the font are accomplished. The user can sequence the font instructions in any order, giving him a high degree of flexibility in controlling the font. The following is a synopsis of the various broad categories of font instructions among which users can select in rendering digital fonts:

| Function of Routines | # of Routines |
| --- | --- |
| Freedom and Projection Vectors | 10 |
| Internal and Character Element Pointers | 7 |
| Modifying Internal Settings | 14 |
| Stack Manipulation | 7 |
| Interpolation and Shift Instructions | 7 |
| Moving Points | 8 |
| Reading and Writing Data | 11 |
| Relational and Logical Instructions | 11 |
| IF-Statements Instructions | 2 |
| Arithmetic and Math Instructions | 10 |
| Short Push Instructions | 2 |
| Function Calls | 4 |
| Delta Exceptions | 3 |
| Reading and Writing Metrics | 3 |
| Debugging Instructions | 1 |

The repertoire of font instructions coupled with the flexible approach to grid-fitting give users the freedom to render and to improve upon digital typefaces at low raster resolutions. In particular, the Projection and Freedom vectors disclose a novel method to move control points by specifying a direction of movement and a direction of displacement.

SPECIFIC APPLICATION OF THE METHOD OF THE INVENTION

Having described in detail the general system configuration, the process and the terminology of the method of the invention, the applicant will now apply Delta exceptions to a specific example, namely the modification of an illustrative lowercase letter "o" as shown in FIG. 6 through FIG. 11. Finally, the Projection and Freedom vectors will be used in an example to maintain the diagonal stroke weight of the capital letter "Y" at low raster resolution.

Figure 6:
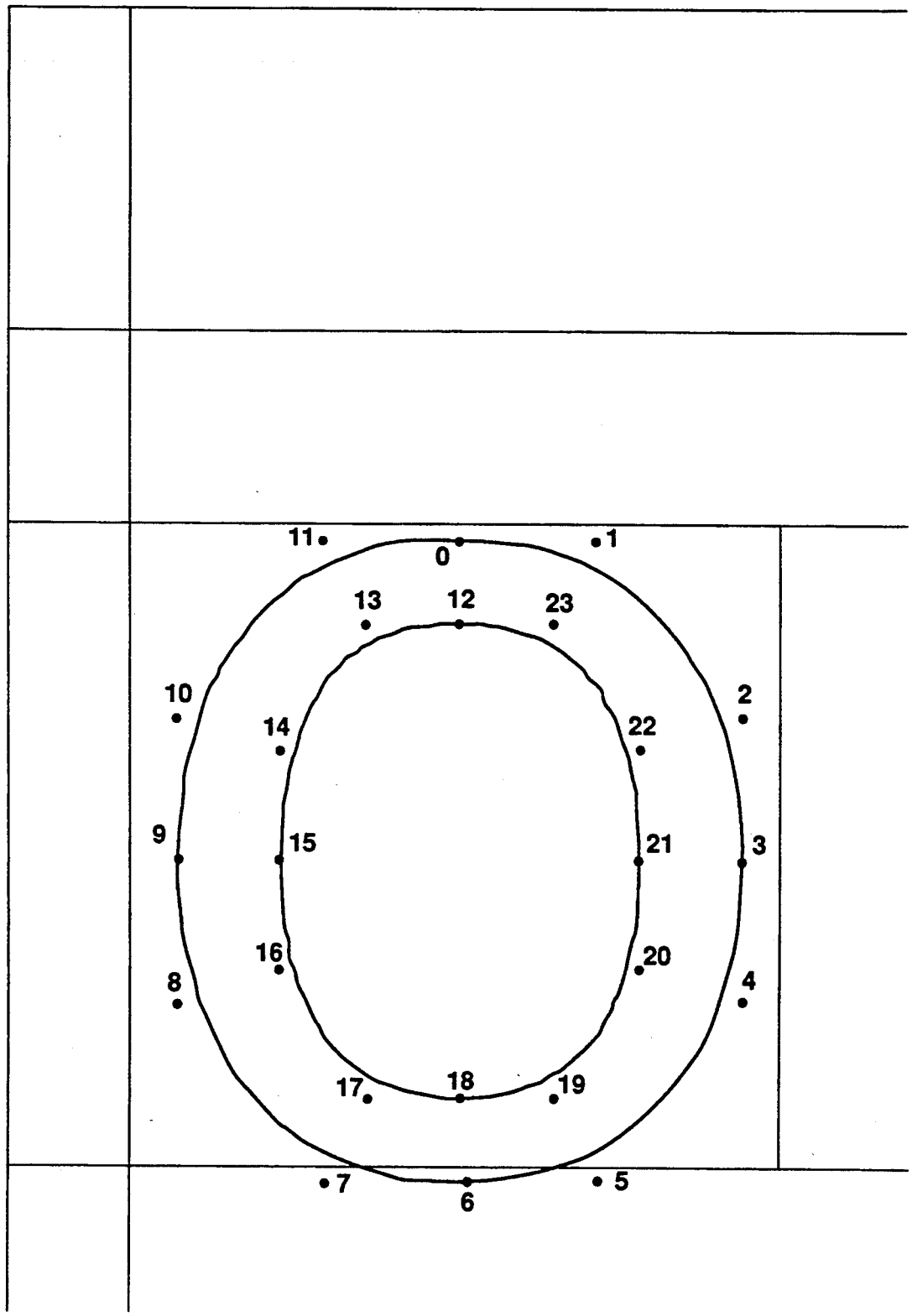
FIG. 6. illustrates B-spline outlines of a character with its control points at low raster resolution.

Referring now to the drawings, the scaled outlines of the original lowercase letter "o" is shown in FIG. 6. The letter has been scaled from size 2048 ppem to size 18 ppem. The contours specifying the lowercase letter "o" comprise two continuous outlines—the outline 0–11 in the clockwise direction and outline 12–23 in the counter-clockwise direction. Control points in a 2nd order B-spline are either on or off the outline: for example, control points 0 and 3 are extrema for the spline between them and control points 1 and 2 are tangents and therefore off the spline curve.

Figure 7:
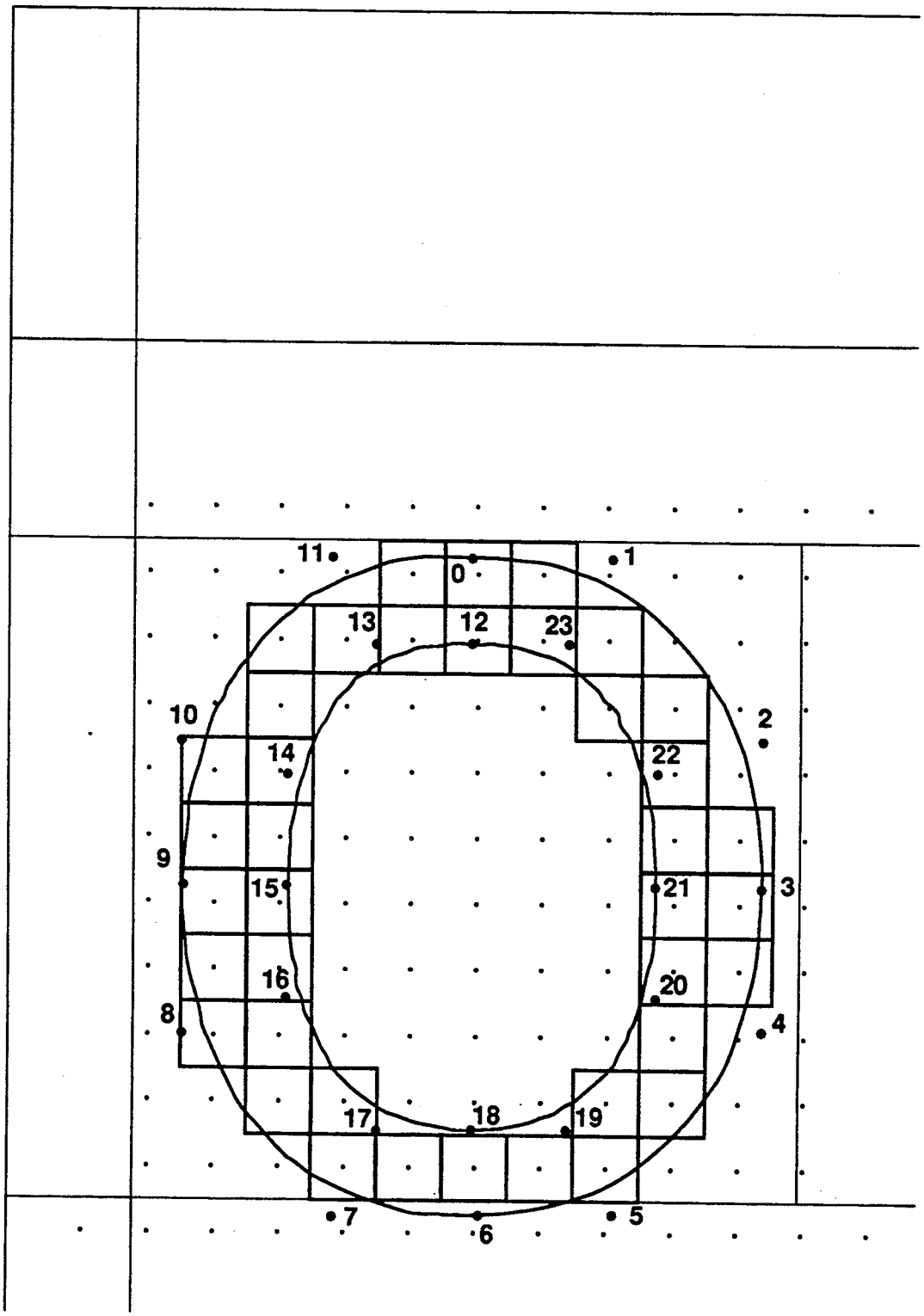
FIG. 7. illustrates B-spline outlines of a character at low raster resolution with its resulting bitmap superimposed thereon.

In FIG. 7 the resulting bitmap of the spline outlines of lowercase letter "o" is superimposed onto the outline. At (10×9) dots resolution, the resulting bitmap of the outline of lowercase letter "o" is unsatisfactory. Not only is the bitmap asymmetrical, but also the vertical and horizontal portions of the bitmap are out of proportion with each other. This visual deterioration occurs because the control points of the outline do not always coincide with the discrete grid position corresponding to the resolution of the raster display device. Moreover, distortion due to small difference in height or width increases when scale of the typeface decreases.

Figure 8:
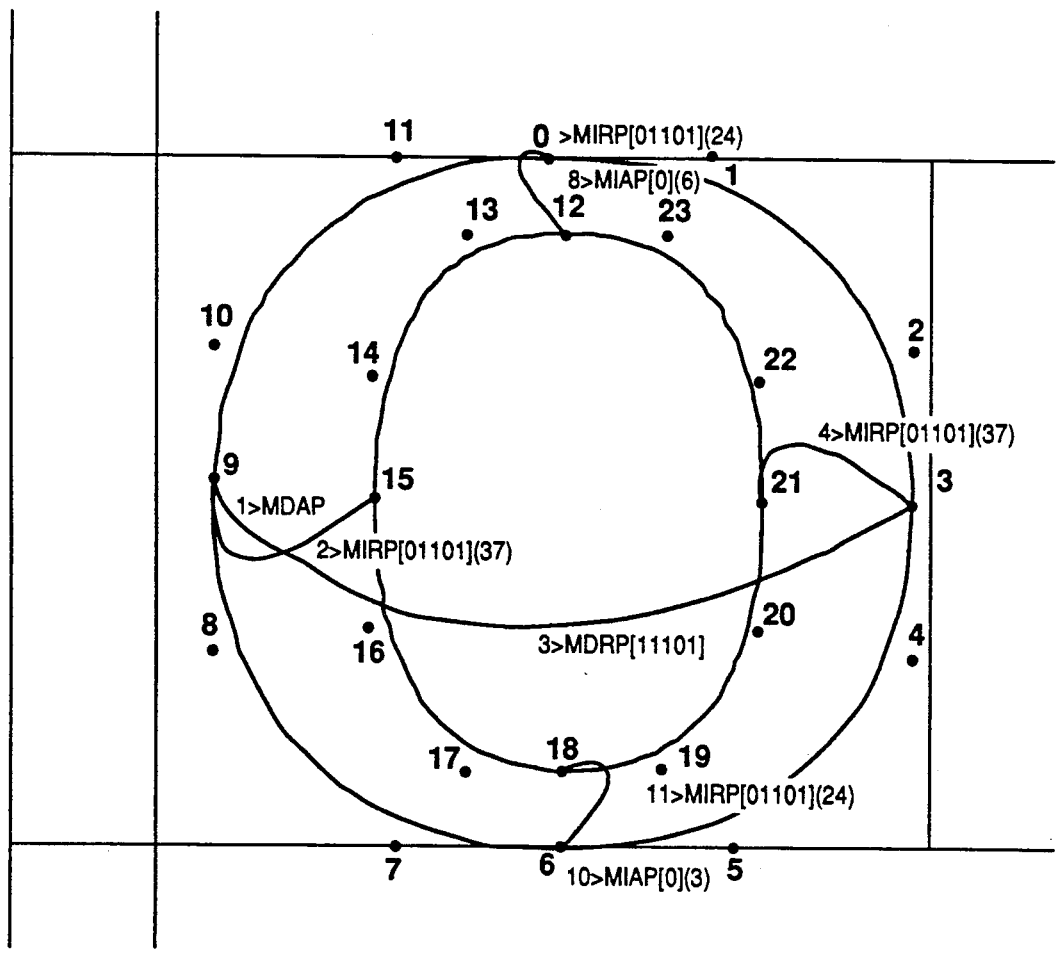
FIG. 8. illustrates an application of delta instructions on a character at low raster resolution to alter control points and outlines.

Referring to FIG. 8, font instructions have been applied to the spline outlines of lowercase letter "o". The instructions are summarized as follows: (i) the Projection and Freedom vectors are set in default to be both in the x-axis, thus in x-axis, move control point 9 left to the closest grid point by using MDAP instruction, (ii) fix a distance between control point 9 and control point 15, (iii) fix another distance between control 9 and control point 3 by using MDRP instruction, (iv) fix a distance between control point 3 and control point 21 similar to that between control points 9 and 15 in part (ii), (v) smooth all other control points untouched by the preceding font instructions, (vi) apply Delta exceptions, and (vii) repeat the preceding steps in a similar fashion in the y-axis by setting Projection and Freedom vectors to y-axis. The font instructions and Delta exceptions for accomplishing the above are also disclosed in the upper portions of FIG. 8.

Figure 9:
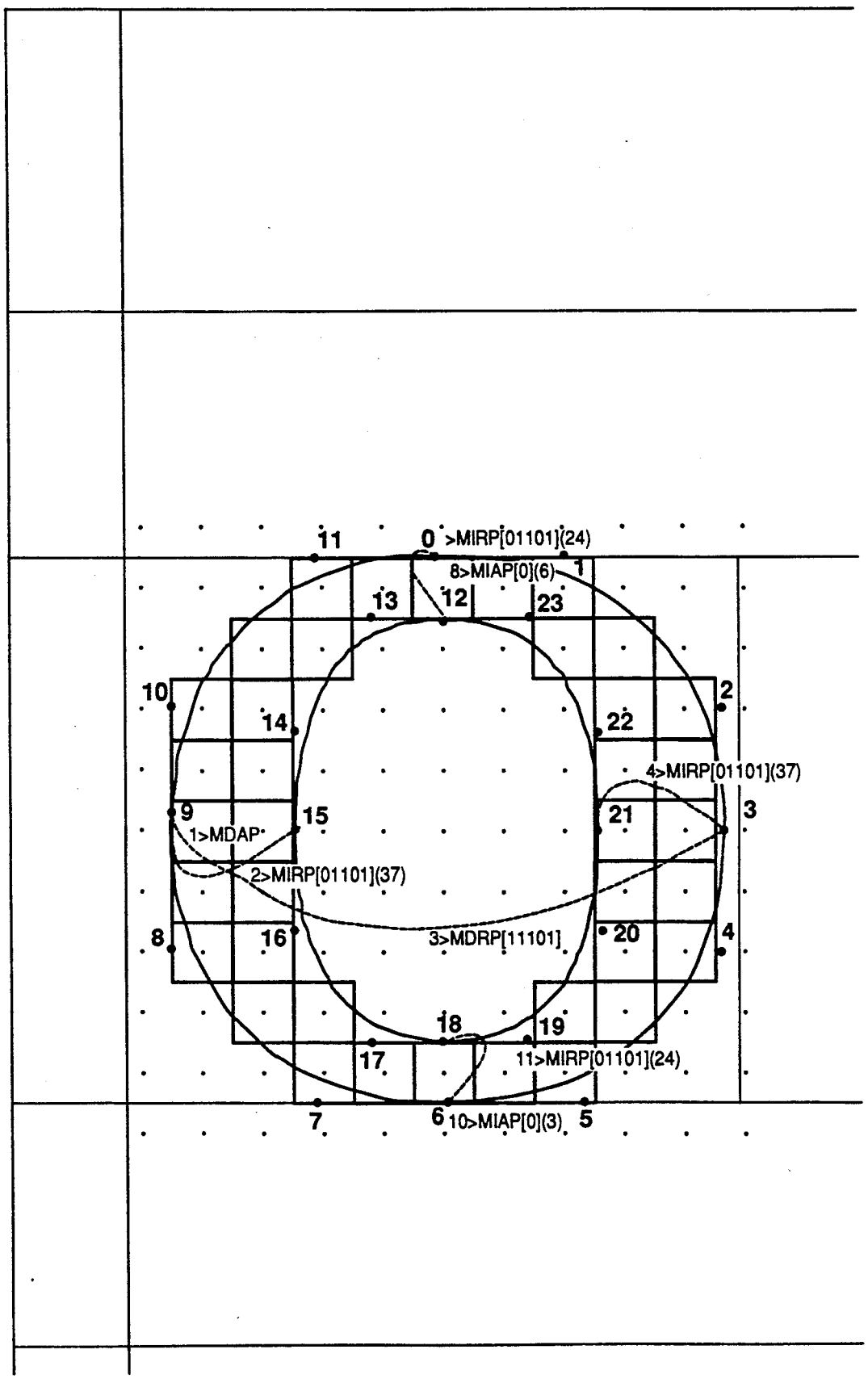
FIG. 9. illustrates an improved resulting bitmap of a character after delta exceptions have been applied to alter control points and outline.

FIG. 9 illustrates the results of applying font instructions together with Delta exceptions in improving the resulting bitmap of the lowercase letter "o" at (10×9) dots resolution. As the pixels in the background show, the digital typeface of the lowercase letter "o" is symmetrical and proportional. More importantly, Delta exceptions are capable of moving more than one control point over a range of point sizes. It follows that user can interactively correct the resulting bitmaps of any glyph over a range of low raster resolutions and in the process build a family of digital typeface better suited for display on low raster output devices.

Figure 10:
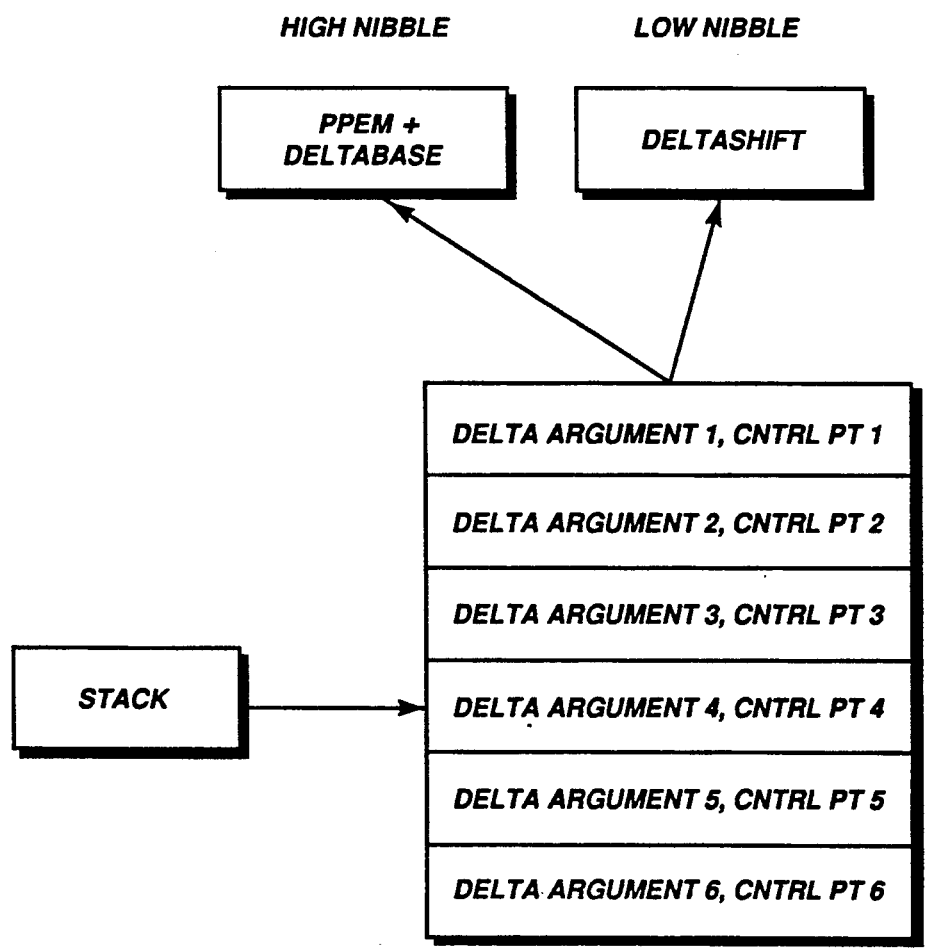
FIG. 10. illustrates data structure of a Delta exception.

The Delta exception takes a variable number of arguments off of the stack and the data structure allows the use of exception of the form: Delta (0) [argument, pt #]. Pt# is the number assigned to a particular control point on an outline. Referring to FIG. 10, the stack has, for instance, six Delta arguments. Each argument is 1 byte long, and composed of two parts: a high size nibble storing a size of the glyph the user wishes to work with; a low control point displacement nibble storing the distance Pt# should move, measured along the Projection vector. A Freedom vector indicates which direction the user wishes the particular control point to move in. To specify the correct size for the high size nibble, the user must subtract the actual ppem from the delta-Base. DeltaBase is set in the global Graphic State and has a default value of 9. If the user does not change the default value of deltaBase, the lowest resolution Delta exception which is operative is 9 ppem. Of course, deltaBase may be changed to suit user's needs.

To indicate the correct distance for the low control point displacement nibble, the user is referred to FIG. 11 which shows an internal remapping table for the low control point displacement nibble of the stack. DeltaShift has values between 0-15. Like deltaBase, deltaShift is found in the global Graphic State and the default value is 3. Delta exceptions move control points by one or multiple fractions (one over two raised to the power of deltaShift) of a pixel. Determining the correct value for the low nibble requires the user to correlate the desired fraction with the output range divided by 2 raised to the power deltaShift. For instance, if the user would like to move pt# a quarter of a pixel to the right, then the output range value of 2 is appropriate (2/8=¼). Therefore, the corresponding input range is 9—the correct value for the low nibble. Just as deltaBase, deltaShift may take on value other than the default value of 3. Note that it is possible to move any control points by a distance greater than a pixel if deltaShift has a value of less than 3.

Suppose the user wants to move point 15 to our glyph ⅛ of a pixel along the x-axis at size 12. No special Projection and Freedom vector set up is necessary because by default, both vectors are set to x-axis. The high nibble would have a value of 12−9=3. To specify ⅛ of a pixel, the output range value of 1 gives us ⅛ when divided by 2 raised to the power of deltaShift. Hence the corresponding input value of 8 should be stored in the low nibble. Combining high nibble with 3 and low nibble with 8 produces the number 56 (00111000, in binary). As such the Delta exception will have the form Delta (o) 56 1.

It can be observed from the above that Delta exceptions permit user of font rendering engines to quickly correct and adjust the outlines of a glyph over a significant range of resolution (9 ppem to 24 ppem in this example). Using Delta exceptions, the applicant has enhanced digital typeface with raster output devices at resolution as low as 72 dpi.

As mentioned earlier, Freedom and Projection vector are means to move control points in desired direction and to measure distances along the Projection vector. The following ten routines are available to manipulate and observe these two vectors:

| Routines | Functions |
|---|---|
| SVTCA(a) | Set Vectors To Coordinate Axis; a = 1 → x-axis a = 0 → y-axis |
| SPVTCA(a) | Set Projection Vector To Coordinate Axis; a = 1 → x-axis a = 0 → y-axis |
| SFVTCA(a) | Set Freedom Vector To Coordinate a-xis; a = 1 → x-axis a = 0 → y-axis |
| SPVTL(a) p1 p2 | Set Projection Vector to Line; a = 0 → no 90 degree rotation; a = 1, yes |
| SFVTL(a) p1 p2 | Set Freedom Vector to Line; a = 0 → no 90 degree rotation; a = 1, yes |
| WPV( ) | Write Projection Vector; |
| WFV( ) | Write Freedom Vector; |
| RPV( ) | Read Projection Vector |
| RFV( ) | Read Freedom Vector |
| SFVTPV( ) | Set Freedom Vector To Projection Vector |

Freedom and Projection vectors are unit vectors. The Freedom vector specifies the direction a selected control point should move. At the same time, the Projection vector specifies a direction along which the difference in distance between the original position of the control point and the desired position of the control point is measured. The resulting vector RV can be expressed as follows:

$$RV = \frac{(DDP - CDP) \times \text{Freedom vector}}{\text{Projection vector} \times \text{Freedom vector}}$$

Figure 12A:
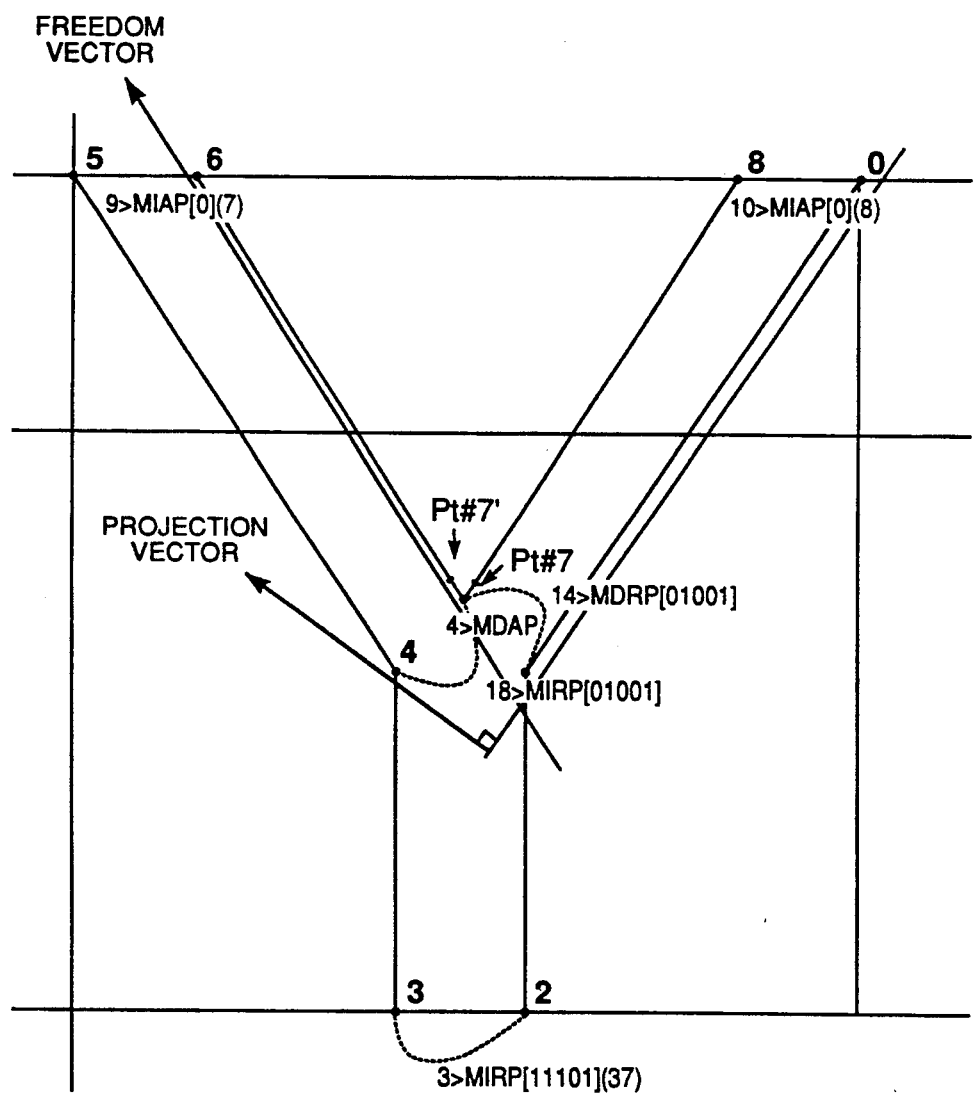
FIG. 12. illustrates an application of Projection and Freedom vectors in maintaining the diagonal stroke weight of the letter "Y".
Figure 12B:
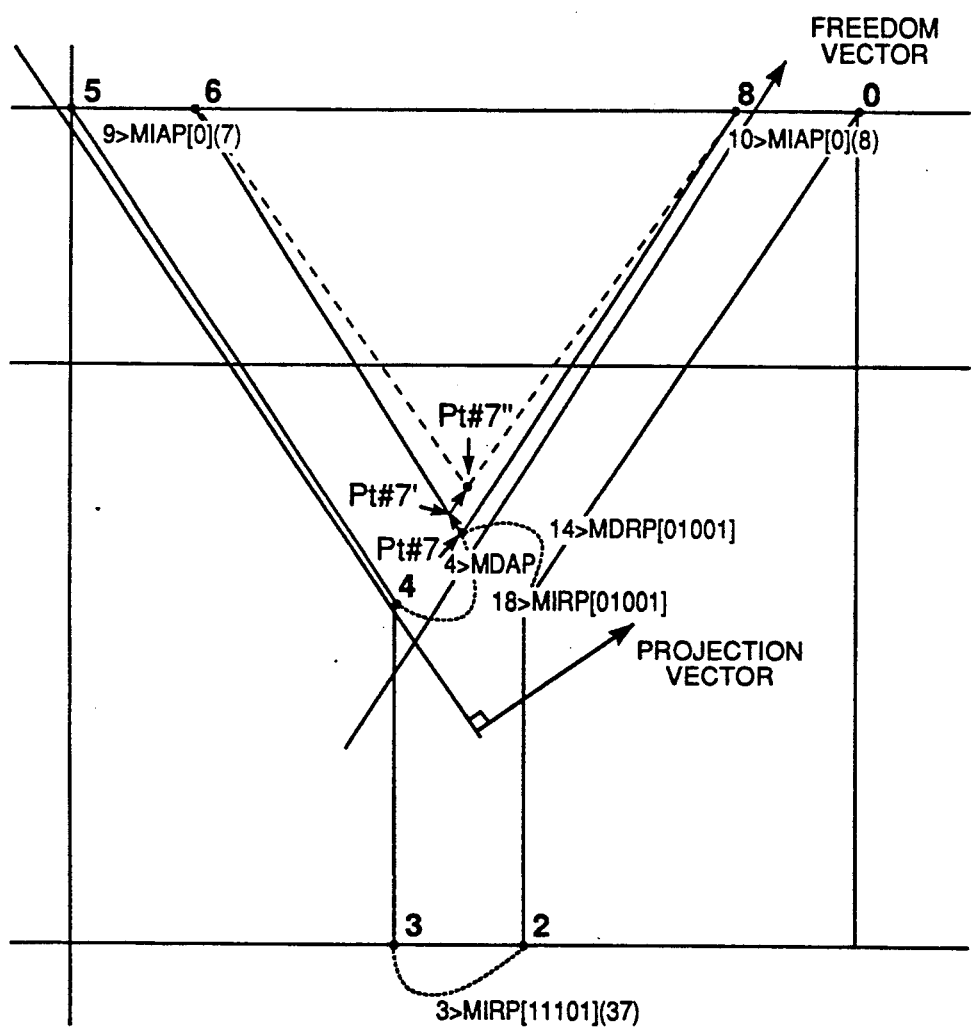

DDP = Desired Distance Projection (new position for control point)
CDP = Current Distance Projection (original position for control point)
New position of control point = original position + RV Referring to FIG. 12, a capital letter "Y" is shown with the diagonal extension having different stroke width as it is being scaled to smaller ppem. FIG. 13 illustrates the application of font instructions including Delta exceptions and Projection and Freedom vectors to adjust the diagonal strokes of Y. Manipulation of control point 7 with Freedom and Projection vectors can be found in lines 7, 11, 12, 15, 16, and 20. In line 7 the Freedom and Projection vectors are set to the y-axis with SVTCA(0) instruction. In line 11, the Projection vector is set parallel to the line between control points 1 and 0., then the Projection vector is rotated 90 degree from line 1-0, resulting in the Projection vector being perpendicular to line 1-0. In line 12, the Freedom vector is set to an axis parallel to line between control points 6 and 7. It follows that control point 7 will move along the line defined by control points 6 and 7 since the Freedom vector tells the control point the direction it should move. In line 13, control point 1 is set as a reference point by using SRPO (0) instruction. In line 14, MDRP instruction moves control point 7 a predetermined distance to control point 7' along the Freedom vector after the Projection vector determines the desired distance projection between control point 7 and control point 1. By using the above equation, 7'=7+RV. The preceding step are repeated in lines 15-18. Here control point 7' will be moved to control point 7" by specifying the Projection vector to be perpendicular to the line defined by control points 5 and 4, and Freedom vector to be parallel to the line defined by control points 7 and 8. The effect is to move control point 7 along the Freedom vectors until a balance of the diagonal stroke weight of letter "Y" is achieved.

It will be appreciated from the preceding description of a specific application of the method of invention that the method can be used in a variety of application to enhance digital typeface or font data that is capable of providing resulting bitmap at low raster resolution. Moreover, the format of font input data is not restricted to 2nd order B-spline fonts. For instance, any one of the outline type formats are suitable as input data for outline enhancement with Delta Exceptions. Similarly, the method can be used to produce grid-aligned outlines for output to other raster output devices.

What is claimed is:

1. A method for manipulating the control points of a symbol image for modifying digital typeface on a raster output device, comprising the steps of:

storing in a first memory means control points specifying the outlines of a symbol image, said first memory including addresses of a plurality of desired movement directions and desired measurement directions;

specifying a first vector which defines a desired movement direction in which said control points should move;

specifying a second vector which defines a desired measurement direction by which movement of said control points should be measured, said first and second vectors defining an angle;

moving said control points in said desired movement direction by using values specified for said desired movement direction;

measuring the movement of said control points against said angle with said desired movement direction, said measurement producing a resulting movement direction and a resulting vector;

storing the results of the movement of said control points in a second memory means;

whereby a different set of control points specifying an outline of a modified symbol image is formed.

2. The method as defined in claim 1, wherein said angle may be between 0 degrees and 360 degrees.

3. The method as defined in claim 1, wherein said resulting vector has the following relationship:

resulting vector = {(DDP−CDP)×desired movement direction} divided by (desired movement direction × desired measurement direction), where CDP is the current distance projection and DDP is the desired distance projection.

4. The method as defined in claim 3, wherein said control point has a new position equal to the original position plus the resulting vector.

* * * * *